Feb. 22, 1927. 1,618,881
E. JUNKER
DETACHABLE HEEL PAD FOR BOOTS AND SHOES
Filed April 17, 1924   2 Sheets-Sheet 1
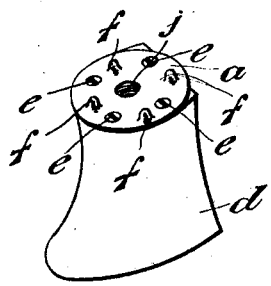
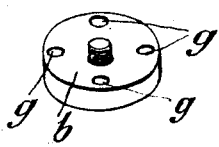
Fig.1.   Fig.2.   Fig.2a.
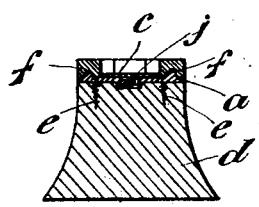
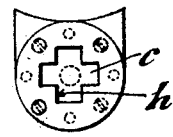
Fig.3.   Fig.4.
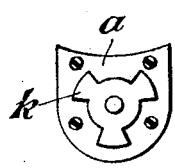
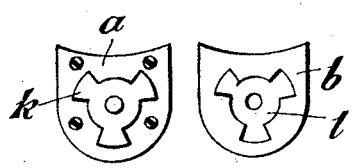
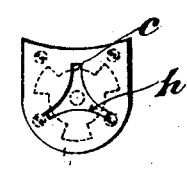
Fig.5.   Fig.6.   Fig.7.   Fig.8.
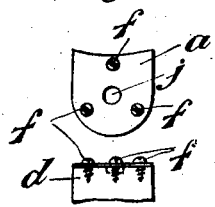
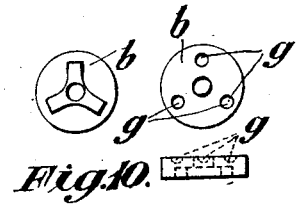
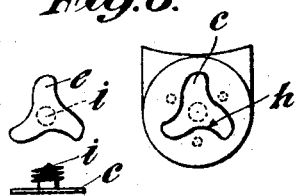
Fig.9.   Fig.10.   Fig.11.   Fig.12.   Fig.13.

Patented Feb. 22, 1927.

1,618,881

UNITED STATES PATENT OFFICE.

ERNEST JUNKER, OF LONDON, ENGLAND.

DETACHABLE HEEL PAD FOR BOOTS AND SHOES.

Application filed April 17, 1924, Serial No. 707,212, and in Great Britain April 27, 1923.

This invention relates to detachable heel pads for boots and shoes and it consists broadly of a device of this character comprising in combination clamping means for the pad which comprise a plate of a shape other than circular which fits in a recess of a corresponding shape in the pad proper so that such clamping means is incapable of turning relative to the pad proper the tightening and releasing of such means being effected by rotating the pad proper and means associated with the opposing faces of the heel and the pad proper adapted to normally hold such pad against rotation when in position on the heel.

I am aware that neither the above clamping means nor the means for preventing the pad from rotating are broadly new per se but as far as I am aware it has never before been proposed to provide a detachable heel pad having the two in combination.

According to a preferred embodiment of the invention the pad proper is adapted to be clamped against the face of an inner plate—which plate is screwed or otherwise attached to the boot heel—by means of an outer member which engages a threaded aperture in the inner plate, said outer member fitting within a correspondingly shaped recess in the outer face of the pad proper, the shape of such member and recess being such as to prevent relative rotation between the two. The means for normally holding the pad against rotation are associated with the opposing faces of both the pad proper and the inner plate. Such means may conveniently consist of interengaging projections and recesses on the plate and pad the resiliency of the pad permitting the same to ride over the projections or recesses on or in the plate when the pad is forcibly rotated as when affixing the pad in position or removing the same.

In order that the invention may be clearly understood several embodiments of the same will now be described by aid of the accompanying drawings in which:—

Figure 1 is a perspective view of a heel with plate attached illustrating one form of the invention.

Figure 2 is a perspective view of the inner side of the heel pad for such form of the invention with the clamping plate in position.

Figure 2ᵃ is a similar view of the clamping plate detached from the pad.

Figure 3 is a sectional elevation of the assembled heel and pad.

Figure 4 is an underside plan view of a modified form of pad.

Figures 5 and 6 illustrate the heel plate and pad of a modified form of the invention.

Figure 7 illustrates a clamping plate for use with the embodiment illustrated in Figures 5 and 6.

Figure 8 is an underside plan view of the heel with the pad, and clamping plate in position.

Figure 9 shows in plan and elevation a modified form of inner or heel plate.

Figs. 10 to 13 illustrate a further embodiment of the invention.

Figure 14:
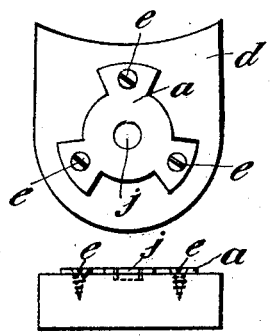
Figure 15:
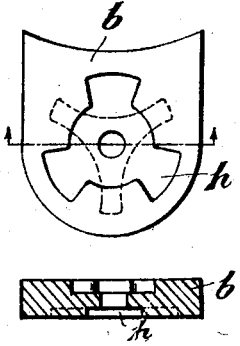
Figure 16:
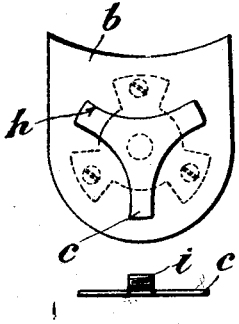
Figure 17:
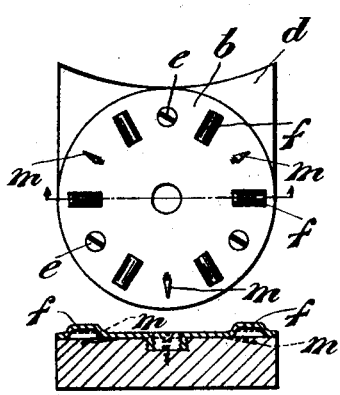
Figure 18:
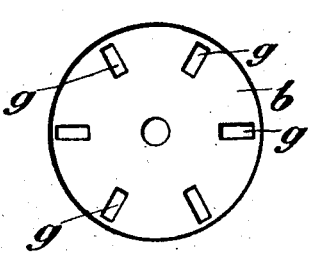
Figure 19:
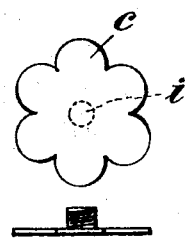
Figure 20:
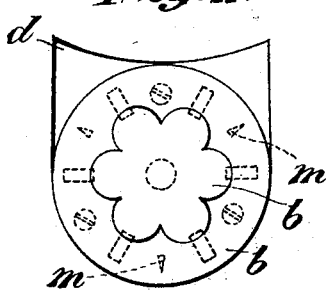
Figure 21:
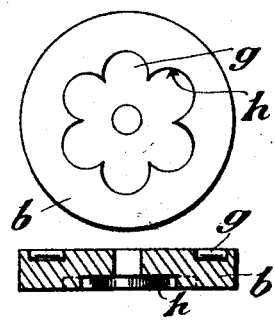

Figures 14 to 16 shew in plan and elevation the embodiment illustrated in Figures 5 to 8 but with a slight modification hereafter to be described.

Figures 17 to 21 illustrate a further form of the invention including heel plate pad and clamping plate.

Figure 22:

Figure 22 is a sectional elevation of a modified form of the heel plate.

All the forms illustrated in the drawings comprise a heel plate $a$, a pad proper $b$ and a clamping plate $c$.

According to the embodiment illustrated in Figures 1 to 4 the heel plate $a$ is circular, attached to the heel $d$ by screws $e$ and provided by punching or stamping with a plurality of rounded projections $f$ which are adapted to engage with corresponding recesses $g$ in the opposing face of the pad $b$.

The clamping plate in this example is in the form of a simple cross and is adapted to fit within a correspondingly shaped recess $h$ in the outside face of the pad, a screwed projection $i$ carried by the clamping plate passing through a central hole in the pad and engaging a threaded recess $j$ in the heel plate. This recess may be either a tubular extension or the edge of the hole in the plate may be provided with a lead $j^1$ as shewn in Figure 22.

In the embodiment illustrated in Figures 5 to 8 the interengaging means on the opposing faces of the heel plate and pad take the form of a raised portion $k$ on the heel pad plate and a corresponding recess $l$ in the pad both in the form of a three armed figure whilst the clamping plate consists of three equally spaced arms as shewn, the recess in the pad to receive it being of corresponding form. During the tightening or releasing of this form of pad the same is bent upwards and inwards by the fingers so as to clear the raised portion $k$ during rotation.

In the modification illustrated in Figures 9 to 13 the projections $f$ are constituted by the rounded heads of screws used to affix the plate to the heel.

In Figures 14 to 16 the raised projection of the form shewn in Figure 5 is dispensed with, in this example the heel plate itself being shaped to constitute the projection, the method of tightening and releasing the pad being the same as adopted in the forms illustrated in Figures 5 to 8.

In Figures 17 to 21 the projections $f$ are arranged radially on the heel plate whilst centering nicks $m$ are struck out of the plate intermediate the projections.

A similar simple nick $n$ is provided on the plate shewn in Figure 22 and serves the purpose of holding the plate in the correct position whilst one of the fixing screws is being screwed home into the heel.

It will of course be appreciated that the forms of the interengaging parts of the heel plate, pad and clamping plate may be modified in a number of ways the only desideration being that in all cases the same must be capable of normally preventing relative rotation between the parts.

What I claim and desire to secure by Letters Patent is:—

In a detachable heel pad for boots and shoes in combination a resilient pad, a non-circular recess in the outer face of said pad, a clamping screw, a non-circular head on said clamping screw fitting in the corresponding recess in the pad whereby said screw is detachable and is rotated by rotating said pad, a threaded recess in the heel adapted to receive said screw and a plurality of interengaging means on said heel and said pad disposed on a circle concentric with the turning axis of the pad to prevent the latter from rotating accidentally.

In witness whereof I affix my signature.

ERNEST JUNKER.